United States Patent [19]

Mixer

[11] 4,411,173

[45] Oct. 25, 1983

[54] MULTI-PURPOSE FRONT END PLATE FOR MOTOR OF PNEUMATIC TOOL

[75] Inventor: John E. Mixer, Chardon, Ohio

[73] Assignee: Black & Decker Inc., Newark, Del.

[21] Appl. No.: 298,378

[22] Filed: Sep. 1, 1981

[51] Int. Cl.³ .............................................. F16H 57/10

[52] U.S. Cl. ....................................... 74/785; 173/104

[58] Field of Search ......................... 74/801, 788, 785; 173/105, 104, 163 R; 403/13, 14, 355, DIG. 8

[56] References Cited

U.S. PATENT DOCUMENTS

| | | | |
|---|---|---|---|
| 2,159,232 | 10/1957 | Shaff . | |
| 2,198,921 | 4/1940 | Shaff | 74/801 |
| 2,470,256 | 5/1949 | McIlory | 403/DIG. 8 |
| 3,238,848 | 4/1963 | Bent . | |
| 3,642,389 | 2/1972 | Chambers . | |
| 3,901,631 | 8/1975 | Wickham . | |

FOREIGN PATENT DOCUMENTS

| | | | |
|---|---|---|---|
| 1363923 | 5/1964 | France | 74/801 |
| 806044 | 12/1958 | United Kingdom | 74/801 |

OTHER PUBLICATIONS

Design News, "The Amplexologist", 3/13/61.

*Primary Examiner*—Lawrence J. Staab
*Assistant Examiner*—D. Wright
*Attorney, Agent, or Firm*—R. B. Sherer; H. Weinstein; Charles E. Yocum

[57] ABSTRACT

The front end plate for the motor of a portable pneumatic tool has an integral annular portion extending forwardly of a bearing seat in the end plate. An internal ring gear is formed within the annular extending portion and engages planetary gearing carried by an output spindle. The planetary gearing engages a pinion gear on the motor shaft, and the shaft is journaled in a bearing retained in the bearing seat in the end plate. The annular extending portion of the end plate has an outer cylindrical surface for piloting the counterbored rear portion of a housing within which the output spindle is journaled. The end plate is alined circumferentially with the motor housing, and independently thereof, the end plate is alined circumferentially with the cylindrical liner of the motor. As a result, the motor liner is automatically alined with the motor housing during the assembly of the tool. The end plate thus serves a variety of purposes or functions; and preferably, the end plate is sintered from a suitable material to improve reliability and to reduce overall manufacturing costs.

6 Claims, 5 Drawing Figures

MULTI-PURPOSE FRONT END PLATE FOR MOTOR OF PNEUMATIC TOOL

BACKGROUND OF THE INVENTION

In the prior art relating to pneumatic tools, the front end plate for the pneumatic motor is usually provided with a bearing seat, and a bearing is retained in the bearing seat for journaling the rotor shaft. The end of the rotor shaft is normally provided with a pinion gear, and the pinion gear engages suitable gearing in the tool housing. For reasons of compactness, the gearing may comprise planetary gearing carried by an output spindle journaled in the housing. The planetary gearing engages the pinion gear and cooperates with a separate internal ring gear mounted within the housing.

SUMMARY OF THE INVENTION

It is an object of the present invention to provide a multipurpose end plate for the motor in a pneumatic tool or other device.

It is another object of the present invention to provide an end plate having an integral annular extension, the inner portion of which is formed as a ring gear, and the outer portion of which provides a cylindrical pilot for a portion of the tool housing.

It is yet another object of the present invention to provide a multipurpose end plate comprising a unitary member sintered from a suitable material.

It is a further object of the present invention to circumferentially aline the end plate with the motor housing, and independently aline the end plate with the cylindrical liner of the pneumatic motor, thereby automatically alining the motor liner with the motor housing during the assembly of the components of the pneumatic power tool.

It is yet a further object of the present invention to provide a mulitpurpose end plate for improving reliability, while reducing overall manufacturing costs and facilitating future service and repair of the tool.

In accordance with the teachings of the present invention, a pneumatic tool or other device has a motor in a housing. The motor comprises a cylindrical liner and a rotor provided with a rotor shaft. The front end plate of the motor comprises a cylindrical member having a bore and a counterbore therein, the latter providing a seat for a bearing. The motor shaft extends through the bore and is journaled in the bearing. A pinion gear is formed on the end of the rotor shaft forwardly of the bearing. The cylindrical member is provided with an integral annular portion extending forwardly of the bearing. An internal ring gear is formed within the annular extending portion, and gearing means is provided between the internal ring gear and the pinion gear on the rotor shaft. The annular extending portion of the cylindrical member has an outer cylindrical surface for piloting a second housing thereon forwardly of the motor housing.

In accordance with the further teachings of the present invention, the multipurpose end plate is circumferentially alined with the motor housing and with the cylindrical liner, respectively and independently, thereby alining the cylindrical liner with the motor housing during assembly of the tool, and thereby assuring alinement of air exhaust passageways formed in the liner and motor housing, respectively.

In accordance with the still further teachings of the present invention, the multipurpose end plate comprises a unitary member sintered from a suitable material.

These and other objects of the present invention will become apparent from a reading of the following specification, taken in conjunction with the enclosed drawings.

DETAILED DESCRIPTION

Figure 1:
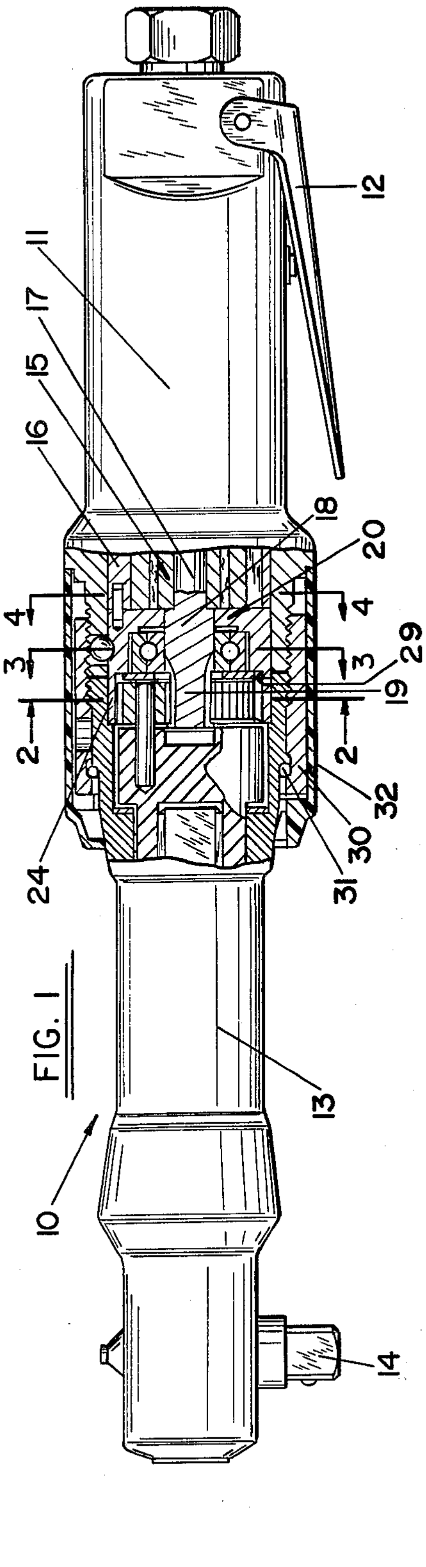
FIG. 1 is an elevation of a typical pneumatic tool, with parts broken away and sectioned to show the multipurpose end plate of the present invention.
Figure 4:
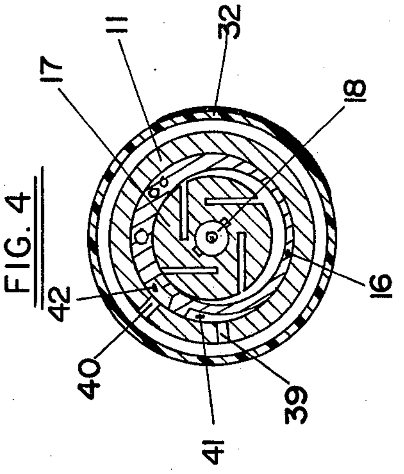
Figure 5:
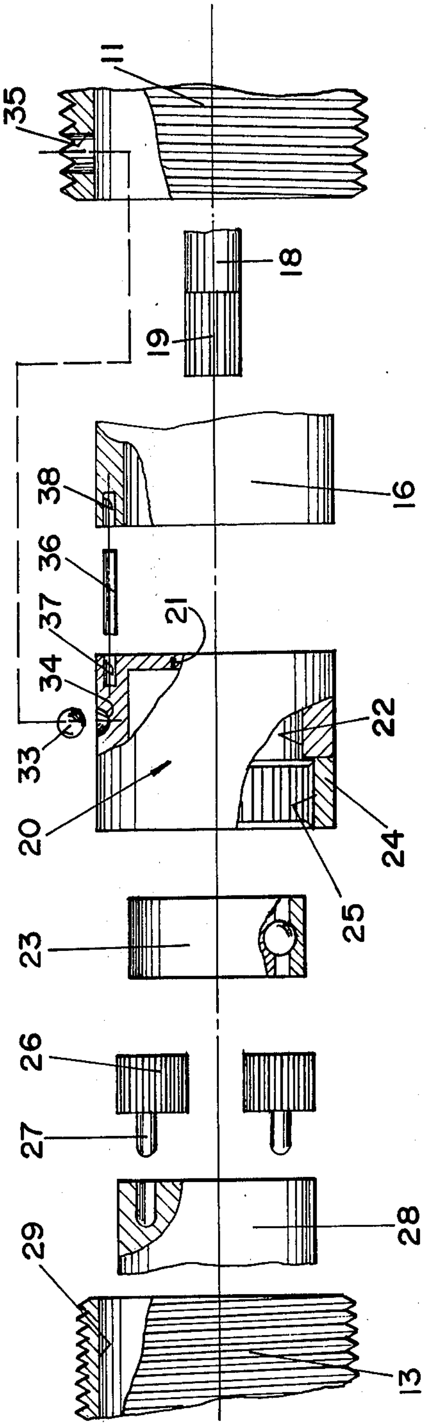

FIG. 4 is a section view taken along the lines 4—4 of FIG. 1, showing the means for circumferentially alining the end plate with the cylindrical liner of the pneumatic motor, and further showing a portion of the air exhaust means; and FIG. 5 is an exploded elevation with parts broken away and sectioned, showing the multipurpose end plate of the present invention in relationship to the other components of the pneumatic tool.

With reference to FIG. 1, there is illustrated a pneumatic ratchet wrench 10 within which the teachings of the present invention may find particular utility. However, it will be appreciated by those skilled in the art that the teachings of the present invention are equally applicable to a wide variety of pneumatic tools and other pneumatic devices. With this in mind, the wrench comprises a motor housing 11, a paddle trigger 12 for controling the air flow and energizing the tool, a ratchet housing 13 forwardly of the motor housing, and a right-angle tool spindle 14 for driving a variety of sockets (not shown). A pneumatic motor 15 is housed in the motor housing. The motor has a stator or stationary portion, comprising a cylindrical liner 16, and a rotary portion comprising the rotor 17. The rotor includes a rotor shaft 18 having a pinion gear 19 formed thereon.

Figure 2:
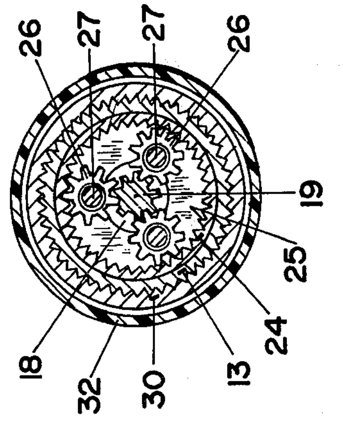
FIG. 2 is a section view taken along the lines 2—2 of FIG. 1, showing the planetary gearing cooperating with the internal ring gear formed within an integral annular extension of the end plate.

With reference to FIG. 1 and to the remaining drawings, and in accordance with the teachings of the present invention, a multi-purpose front end plate 20 is provided for the motor. Preferably, the end plate is a powdered metal ("p.m.") piece sintered from a high-strength steel alloy. The end plate thus has a unitary construction and comprises a generally cylindrical member having a bore 21 and a counterbore 22, the latter forming a bearing seat for a ball bearing 23. The rotor shaft 18 extends through the bore and is journaled in the bearing. The end plate has an integral annular portion 24 extending forwardly therefrom, and as shown more clearly in FIGS. 2 and 5, an internal ring gear 25 is formed within the annular extension of the end plate. The ring gear meshes with a set of planetary gears 26 driven by the pinion gear 19 on the rotor shaft. The planetary gears are carried on respective pins 27 mounted on the rear portion of an output spindle 28. The output spindle is suitably journaled in the ratchet housing 13 and is coupled by suitable means (not shown) to the tool spindle 14. The integral annular extension 24 of the multipurpose end plate has an outer cylindrical surface, shown in FIGS. 1 and 5, for piloting thereon a counterbored rear portion 29 of the ratchet housing, radially of the internal ring gear. This piloting feature of the multipurpose end plate assures a concentric alinement between the ratchet housing and the motor housing. The ratchet housing is abutted axially against the motor housing and is secured thereto by a threaded nut 30. The nut carries a suitable annular seal 31, and a plastic sleeve 32 is fitted over the nut as shown in FIG. 1.

Figure 3:
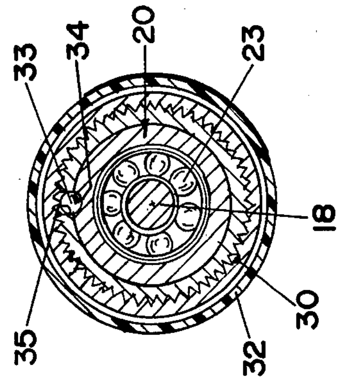
FIG. 3 is a section view taken along the lines 3—3 of FIG. 1, showing the means for circumferentially alining the end plate with the motor housing.

In accordance with the further teachings of the present invention, the multipurpose end plate 20 is circumferentially alined with the motor housing 11 by means of a ball 33. As shown in FIGS. 3 and 5, the ball is received jointly in a pocket 34 on the external surface of the end plate and a hole 35 drilled in the motor housing. Independently thereof, the multipurpose end plate is circumferentially alined with the cylindrical liner 16 by means of a pin 36. As shown in FIGS. 4 and 5, the pin is received in complementary cylindrical openings 37 and 38 in the end plate and liner, respectively. With this arrangement, the cylindrical liner will be automatically alined circumferentially with the motor housing during assembly of the components of the tool, thereby simplifying the assembly procedure. This assures that the air exhaust means will be properly alined in the assembled tool. As shown in FIG. 4, this air exhaust means includes a pair of holes 39 and 40 in the motor housing and a pair of axial exhaust passageways 41 and 42 in the motor liner. The air exhaust means, however, is considered well-known in the art and forms no part of the present invention.

In summary, it will be readily appreciated by those skilled in the art that the end plate 20 of the present invention thus serves a variety of functions or purposes. The internal ring gear 25 is formed integrally with the end plate, and a separate broaching operation for the gear teeth is eliminated. The end plate also pilots the rear portion of the ratchet housing, radially of the ring gear, and thus provides for a concentric alinement between the ratchet housing and motor housing. Since the end plate is alined circumferentially with both the cylindrical liner and the motor housing, separately and independently, the liner is automatically alined with the motor housing (via the end plate) during assembly of the tool. This arrangement simplifies the assembly procedure and assures proper alinement of respective air exhaust passageways in the liner and motor housing. Finally, the multipurpose end plate of the present invention has a unitary construction and is preferably sintered from a suitable material. As a result, overall manufacturing costs are reduced, reliability is improved, and the tool may be conveniently disassembled for service and repair.

Obviously, many modifications may be made without departing from the basic spirit of the present invention. Accordingly, it will be appreciated by those skilled in the art, that within the scope of the appended claims, the invention may be practiced other than has been specifically described herein.

I claim:

1. In combination with a pneumatic tool or other device having a motor housing and further having a second housing forwardly of the motor housing, a motor in the motor housing, the motor having a liner and further having a rotor provided with a rotor shaft, a multipurpose front end plate for the motor, said end plate comprising a cylindrical member having a bore and a counterbore therein, the counterbore providing a bearing seat, a bearing in the bearing seat, the rotor shaft passing through the bore and being journaled in the bearing, a pinion gear on the end of the rotor shaft forwardly of the bearing, the cylindrical member further having an integral annular portion extending forwardly of the bearing, an internal ring gear formed within the annular extending portion, gearing means between the internal ring gear and the pinion gear on the rotor shaft, the annular extending portion of the cylindrical member further having an outer cylindrical surface for piloting the second housing thereon, and means for circumferentially alining the cylindrical member with the motor housing, said means including a hole formed in the motor housing, the cylindrical member having an external pocket formed thereon, and a ball seated between the hole and the pocket.

2. The combination of claim 1, wherein said cylindrical member has a unitary construction and is sintered from a suitable material.

3. The combination of claim 2, wherein said material comprises a high-strength steel alloy.

4. The combination of claim 1, further including means for circumferentially alining the cylindrical member with the liner, thereby automatically alining the liner within the motor housing during assembly of the tool, and thereby assuring proper alinement of respective air exhaust passageways in the liner and motor housing.

5. The combination of claim 4, wherein said means for circumferentially alining the cylindrical member and the liner comprises a pin received in complementary openings formed in the cylindrical member and liner, respectively.

6. The combination of claim 1, wherein said gearing means comprises planetary gearing.

* * * * *